Figure 7:
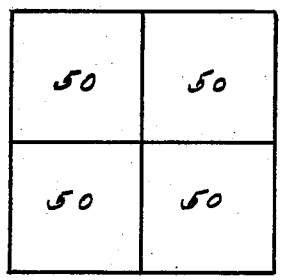

No. 648,612. Patented May 1, 1900.
F. P. GRODE.
PROCESS OF MANUFACTURING BALUSTERS, PILLARS, OR THE LIKE.
(Application filed June 29, 1899.)
(No Model.) 6 Sheets—Sheet 1.
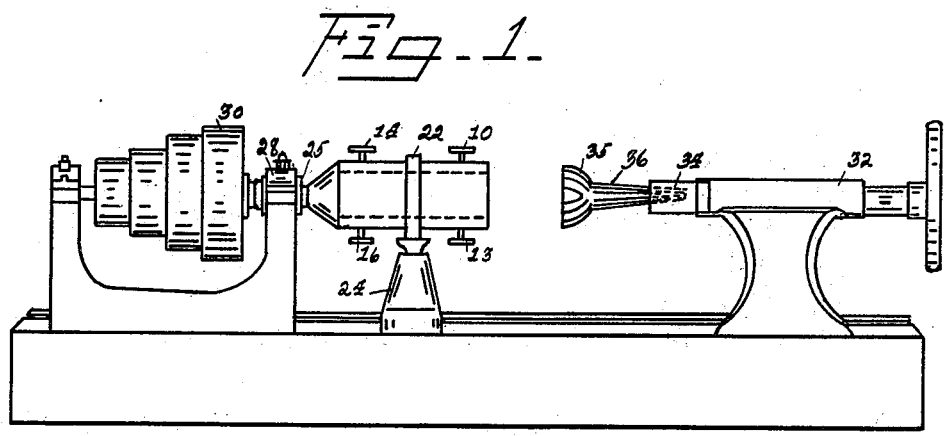
Fig. 1.
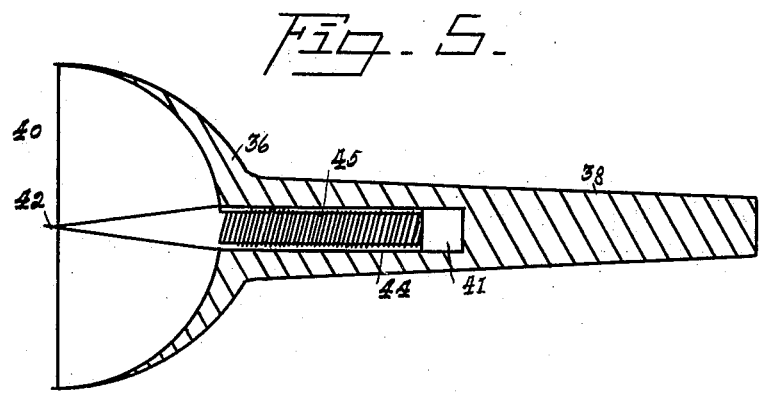
Fig. 5.
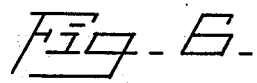
Fig. 6.
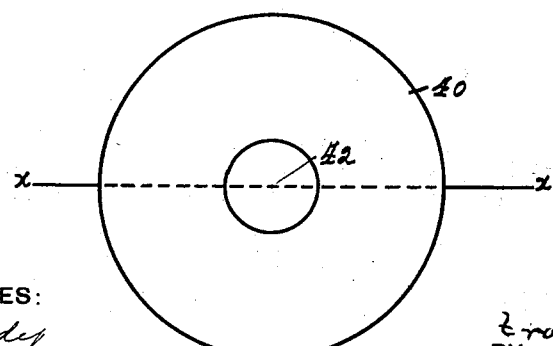
WITNESSES:
E. E. Cady
J. Kelley
INVENTOR
Frank P. Grode
BY
M. M. Cady
ATTORNEY.

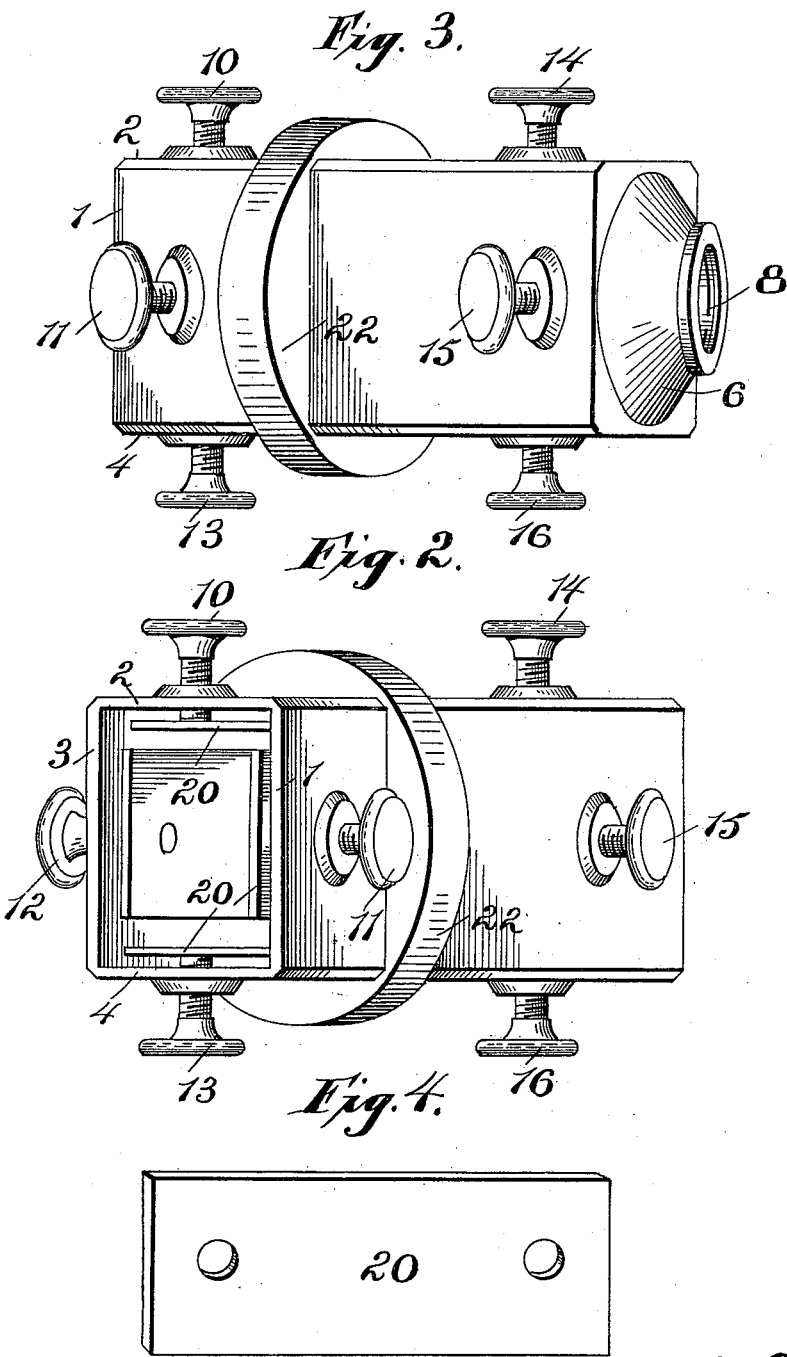

No. 648,612. Patented May 1, 1900.
F. P. GRODE.
PROCESS OF MANUFACTURING BALUSTERS, PILLARS, OR THE LIKE.
(Application filed June 29, 1899.)
(No Model.) 6 Sheets—Sheet 3.

WITNESSES:
E. E. Cady
J. Kelley

INVENTOR
Frank P. Grode
BY
M. M. Cady
ATTORNEY.

No. 648,612. Patented May 1, 1900.
F. P. GRODE.
PROCESS OF MANUFACTURING BALUSTERS, PILLARS, OR THE LIKE.
(Application filed June 29, 1899.)
(No Model.) 6 Sheets—Sheet 4.
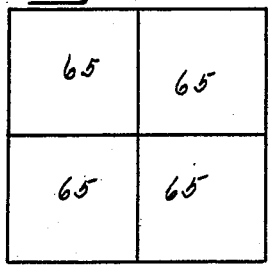
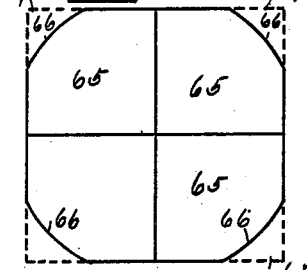
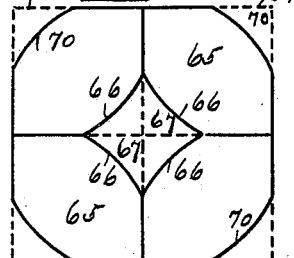
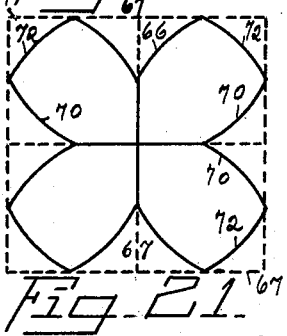
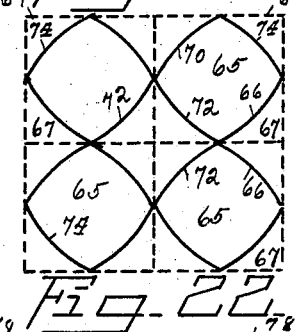
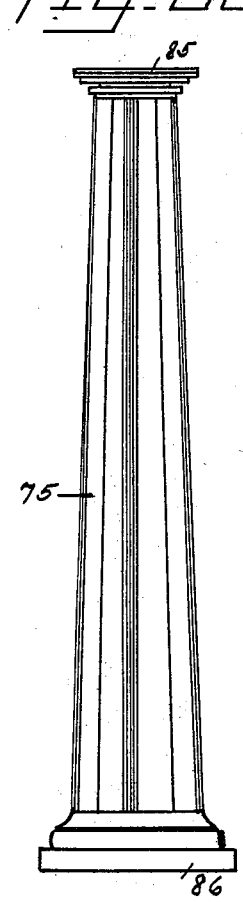
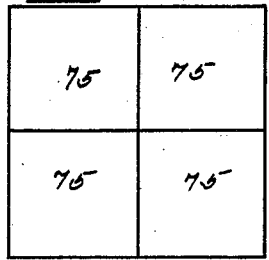
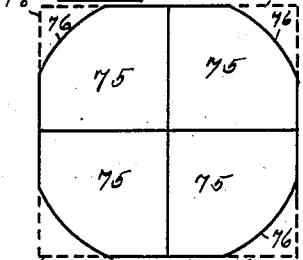
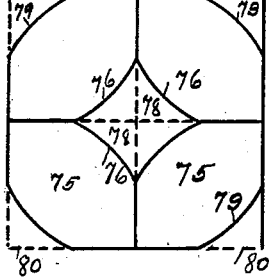
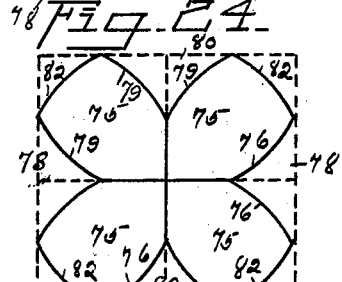
WITNESSES:
E. E. Cady
J. Kelley
INVENTOR
Frank P. Grode
BY
M. M. Cady
ATTORNEY.
THE NORRIS PETERS CO., PHOTO-LITHO., WASHINGTON, D. C.

No. 648,612. Patented May 1, 1900.
F. P. GRODE.
PROCESS OF MANUFACTURING BALUSTERS, PILLARS, OR THE LIKE.
(Application filed June 29, 1899.)
(No Model.) 6 Sheets—Sheet 5.
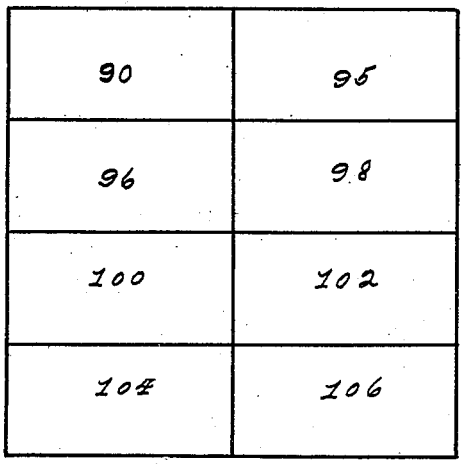
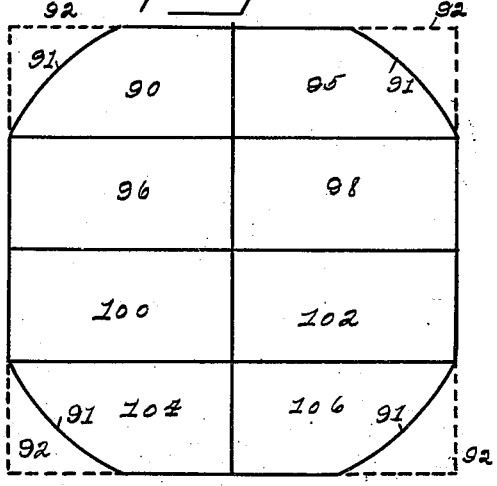
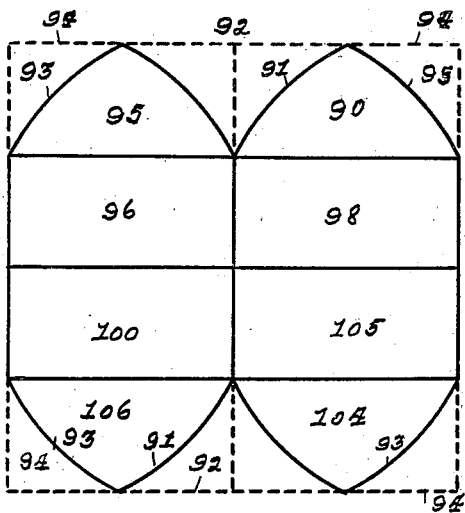
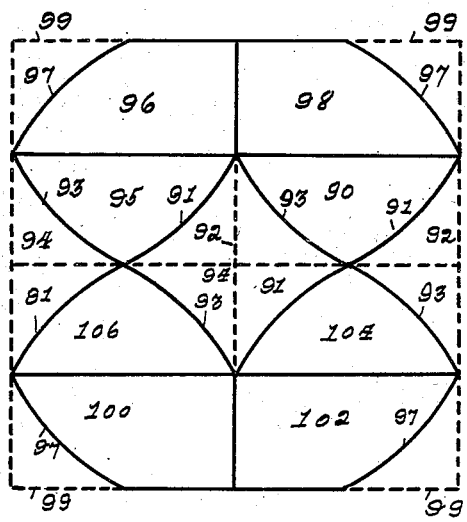
WITNESSES:
E. E. Cady
J. Kelley
INVENTOR
Frank P. Grode
BY
M. M. Cady
ATTORNEY.

No. 648,612. Patented May 1, 1900.
F. P. GRODE.
PROCESS OF MANUFACTURING BALUSTERS, PILLARS, OR THE LIKE.
(Application filed June 29, 1899.)
(No Model.) 6 Sheets—Sheet 6.
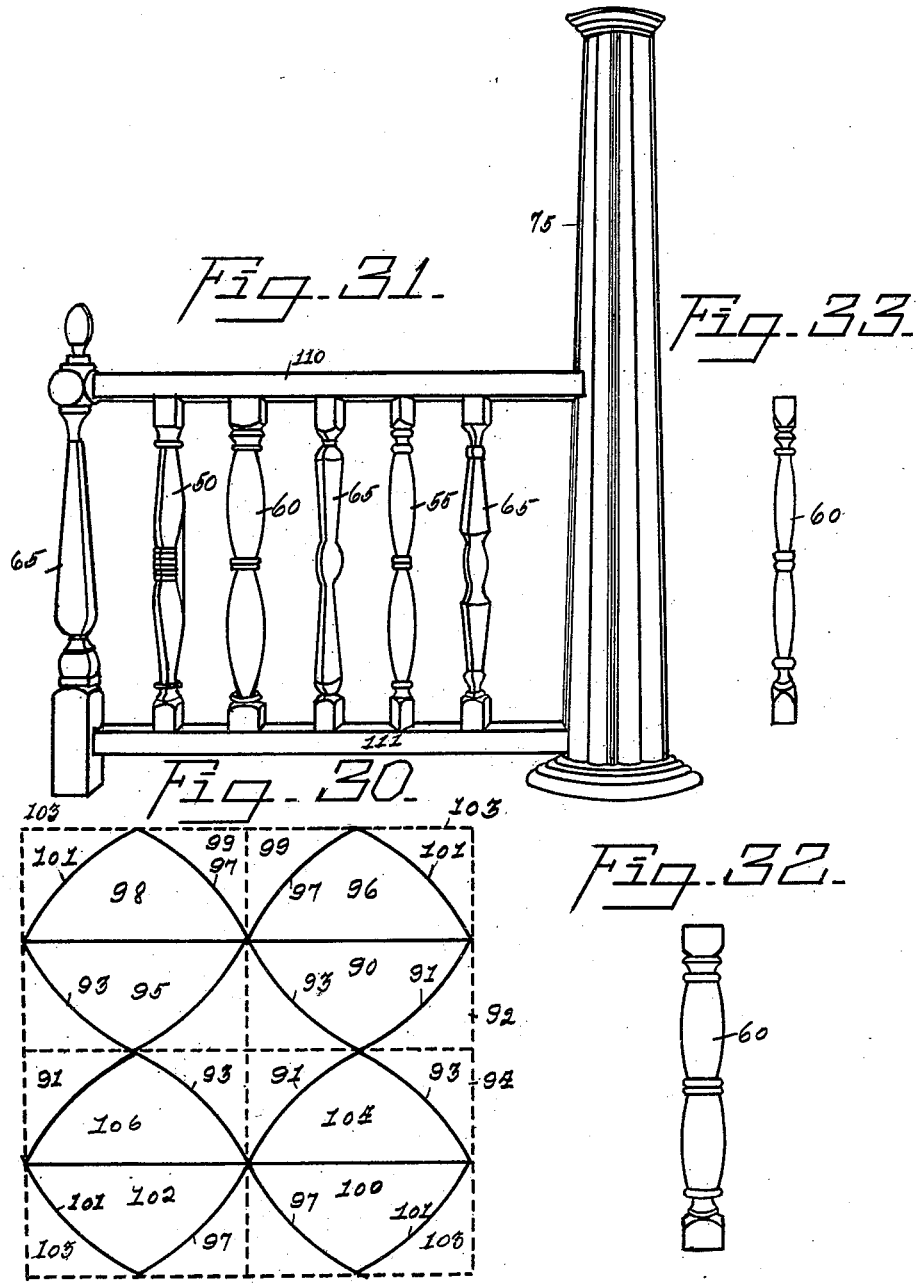

UNITED STATES PATENT OFFICE.

FRANK P. GRODE, OF DUBUQUE, IOWA.

PROCESS OF MANUFACTURING BALUSTERS, PILLARS, OR THE LIKE.

SPECIFICATION forming part of Letters Patent No. 648,612, dated May 1, 1900.

Application filed June 29, 1899. Serial No. 722,352. (No model.)

*To all whom it may concern:*

Be it known that I, FRANK P. GRODE, a citizen of the United States, residing at Dubuque, in the county of Dubuque and State of Iowa, have invented certain new and useful Improvements in Processes of Manufacturing Balusters, Pillars, or the Like; and I do hereby declare the following to be a full, clear, and exact description of the invention, such as will enable others skilled in the art to which it appertains to make and use the same.

My invention has relation to a new and novel art in turning a number of similar forms from wood, in the manufacture of balusters, pillars, spindles, base-angles, newels, and the like used for building purposes, whereby not only a large variety of new and novel designs are produced, but great economy both in labor and material is experienced.

It consists, essentially, in assembling a number of blanks of material together, preferably in pairs, clamping the group together by its periphery, then turning in a lathe the required design upon the outside of the assembled blanks, then shifting the relation of the sides of the members of the blank, reclamping, again turning the outside of the group, and repeating such shifting and turning until the same given design is completed on each blank.

The following description fully explains the nature of my invention and how I obtain the objects sought.

In the accompanying drawings there are shown not only sections of certain designs and the different operations whereby the designs are completed, but also a convenient clamp or chuck for holding the blanks in the turning-lathe.

Figure 8:
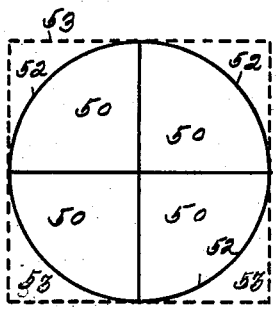
Figure 9:
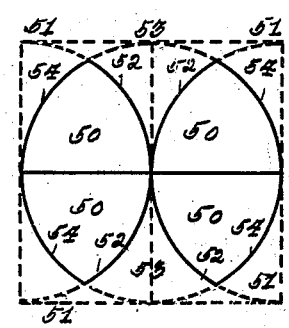
Figure 10:
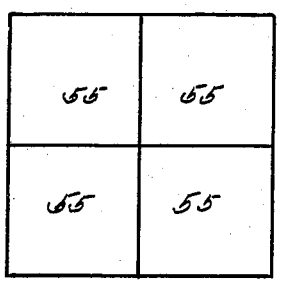
Figure 11:
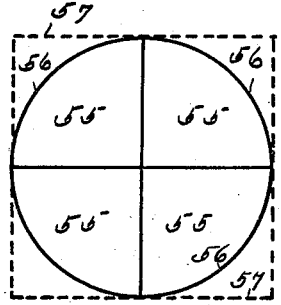
Figure 12:
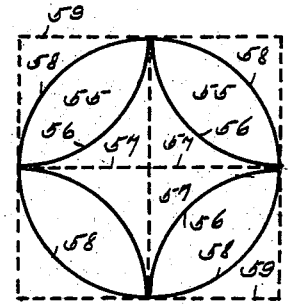
Figure 13:
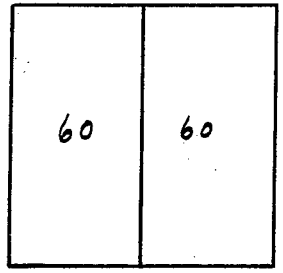
Figure 14:
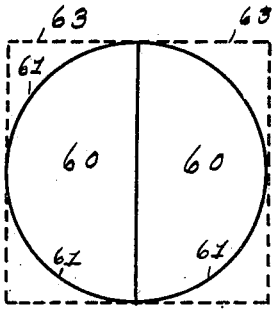
Figure 15:
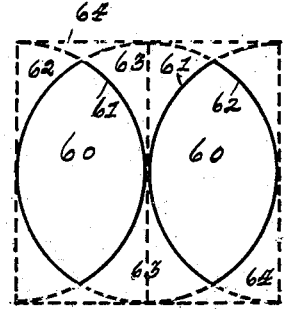

Figure 1 is a side elevation of a turning-lathe with the chuck and tail-center therein. Fig. 2 is a perspective of the chuck, taken from one end and side. Fig. 3 shows a perspective of the chuck from the opposite end of Fig. 2. Fig. 4 is a perspective of one of the plates in the chuck. Fig. 5 shows a longitudinal section of the back-center. Fig. 6 is an end view of Fig. 5. Fig. 7 is a cross-section of four blanks of the material assembled together before inserting in the turning-lathe. Fig. 8 shows a section after the first cut in the turning-lathe, and the dotted lines show the parts cut off from the blanks by the first turning. Fig. 9 shows a cross-section of the completed baluster, the curved solid lines indicating the line of turning and the dotted lines showing the parts cut away. Fig. 10 is a cross-section of four blanks before any turning has been done thereon. Figs. 11 and 12 show cross-sections of the blanks in Fig. 10 after the successive turnings, the curved solid lines representing the line of the various turnings and the dotted lines the parts cut away. Fig. 13 shows a cross-section of a pair of blanks before any turning is done thereon. Figs. 14 and 15 are cross-sections of the blanks shown in Fig. 13 after the various turnings, the solid curved lines representing the line of the turnings and the dotted lines the parts cut away. Fig. 16 shows a cross-section of four blanks. Figs. 17, 18, 19, and 20 represent cross-sections of Fig. 16 after each successive turning has been made, the solid curved lines representing the line on which the various turnings were done and the dotted lines representing the parts cut away. Fig. 21 shows a cross-section of four blanks. Figs. 22, 23, and 24 show cross-sections after each successive turning, the solid curved lines representing the line of turning and the dotted lines the parts cut away by the turnings. Fig. 25 shows a side elevation of a pillar made by uniting together the completed parts shown in Fig. 24. Fig. 26 shows a cross-section of eight blanks before any turning is done thereon. Figs. 27, 28, 29, and 30 show cross-sections of said blanks after the various turnings have been made, the solid curved lines indicating where the turning was made in each figure and the dotted lines showing the part cut away by the successive turnings. Figs. 31 represents a perspective of a section of a balustrade having a pillar, a newel-post, and a variety of different-shaped balusters. Fig. 32 is a side elevation of a baluster shown in Fig. 15. Fig. 33 is an edge view of the same.

Like figures of reference denote corresponding parts in all of the views.

In putting into practice my invention I employ a grasping device or chuck, as shown in Figs. 2 and 3. It consists in a hollow rectangular casting having the sides 1, 2, 3, and 4, open at one end and the other formed into a truncated cone 6, and screw-threaded at 8 for the purpose of attaching it to the head-stock of a turning-lathe. (Shown in Fig. 1.) Through each one of the sides, near the ends, are formed screw-holes, in which are set the thumb-screws 10, 11, 12, 13, 14, 15, 16, and 17. Within the body of the chuck, to the end of the thumb-screws 10 and 14, is rigidly fastened a metal plate 20. (Shown in Fig. 4.) A like plate is similarly secured to the thumb-screws 11 15 13 16 12 17. It is evident that when certain kinds of work are to be operated upon in this chuck there will be no need of using more than the thumb-screws 10, 11, 12, and 13.

For the purpose of sustaining the chuck when in use a central portion 22 of the outside between the thumb-screws 10 and 14 is formed into a circle. There is also adjustably set upon the bed of the lathe a rest 24, upon which the circular portion 22 travels for the purpose of sustaining the chuck in a horizontal position when it is heavily ladened with material. The chuck so formed is attached to a spindle 25 of the head-stock 28 of the lathe. This lathe is provided with the usual cone-pulley 30, around which a belt (not shown) is attached to the power and drives the shaft 25, and with it the chuck. The lathe may be of any well-known pattern and provided with the tail-stock 32, having a back-center 36. (Shown in detail in Figs. 5 and 6.) It consists of a stem 38, terminating at the front end in a cup 40, having a sharp or cutting edge. The center of the stem 38 is recessed out at 41, and in this recess is inserted the centering-pin 42, having the stem 44 and surrounded by coiled wire 45 for the purpose of giving elasticity to the pin 42.

The manner whereby this art of turning is accomplished is substantially as follows: For the manufacture of balusters and the like of any given shape—such, for example, as 50, (shown in cross-section in Fig. 9)—I take four square pieces of lumber 50 of the required length and insert them in the chuck to near the inner end between the plates 20 and then tighten all the thumb-screws in the chuck evenly until the four pieces are slightly held. The tailstock 35 is then forced up against the other end of the four pieces 50, bringing the pin 42 to the center, where the inner corners of the four pieces 50 touch each other, then forcing the cutting edges of the cup 40 into the ends of each of the four pieces. The thumb-screws 10, 11, 12, 13, 14, 15, 16, and 17 are tightened and rigidly hold the four pieces. Power is then applied to the cone-pulley 30, which revolves the chuck, and with it the four pieces. The operator then turns the desired design upon the four pieces at once, cutting to the solid line 52 in Fig. 8, and removes the parts 53. (Shown in dotted lines in Fig. 8.) After this first turning has been finished the thumb-screws are loosened and the relations of the four blanks to each other are shifted by giving each one of the blanks a quarter-turn, then tightening the thumb-screws, and turning upon lines 54, as shown in Fig. 9, leaving the completed balusters 50 as shown in Fig. 9, with the parts shown in dotted lines turned off. This completed baluster 50 is shown in perspective in Fig. 31.

Fig. 10 shows the four blanks 55 before any turning has been done thereon, and in Fig. 11 is shown the first cut along the line 56. In Fig. 12 the balusters are given a half-turn instead of a quarter-turn, as in Fig. 9, and the cut is then made on the line 58. When the baluster 55 is completed, it will present the general appearance of an ellipse, as shown in Fig. 12 and also shown in perspective in Fig. 31 at 55. The parts 57 and 58 are cut away.

Fig. 13 shows two blanks 60, and Fig. 14 shows the first cut along the line 61, and in Fig. 15 the blanks have been given a half-turn, and the turning is then along the line 62. The completed baluster 60 is shown in Fig. 15 with the parts 63 and 64 removed by the turning. (Shown in dotted lines.) Said completed baluster is shown in elevation in Figs. 32 and 33.

Fig. 16 shows four blanks 65, and in Fig. 17 the first turning is done along the line 66, cutting away the parts 67, (shown in dotted lines,) leaving the baluster 65. The relations of the partially-completed balusters 65 are changed by giving each one a half-turn, and the next turning is done along the line 70, as shown in Fig. 18, showing the parts cut away in dotted lines. The relations of these uncompleted balusters 65 are then changed by giving each of them a quarter-turn, and then the operator will cut to line 72, as shown in Fig. 19, leaving the parts cut away. (Shown in dotted lines 67 and 68.) In order to complete these and form a new design, the operator changes the relations of the uncompleted balusters 65 by giving each one of them a half-turn in the chuck and then turning along the line 74, as shown in Fig. 20, when the design is completed and represents a square with curved sides. (Shown in perspective in the newel-post 65 in Fig. 31.)

In Fig. 21 four blanks 75 are shown, and the first turning is done along the line 76 in Fig. 22, cutting away the parts 78. (Shown in dotted lines.) After this first turning has been finished then the relation of the blanks are changed in the chuck by giving them a half-turn, as shown in Fig. 23. The second turning is then along the line 79, removing the parts 80. The operator then changes the relation of the blanks 75 by giving them a quarter-turn and turning along the line 82, as shown in Fig. 24. This completes the turning upon these blanks. They may then be removed from the chuck and united together, as shown at 75 in Fig. 24, and will present the appearance of a pillar 75, as shown in Fig. 25, and all that will be necessary to complete the pillar will be to add the cap 85 and the base 86. The same pillar 75 is also shown in perspective in Fig. 31.

Fig. 26 shows eight blanks 90, 95, 96, 98, 100, 102, 104, and 106. The first turning is done along the line 91 and the part 92 cut away by such turning, as shown in Fig. 27. After the first turning then the relations of the blanks 90, 95, 104, and 106 are changed by simply changing the position of the blank 90 to 95 and 95 to 90 and also by the same reversing of the blanks 104 and 106. The operator then turns along the line 93, removing the parts 94. They will then present the appearance as shown in Fig. 28. The relations of the various parts are changed by exchanging the position of the blank 95 with the blank 96 and the blank 90 with 98, also the blank 100 with 106 and 102 with 104, and by inverting the position of the blanks 90 and 95 and 104 and 106, as shown in Fig. 29. The operator then turns along the line 97, removing the parts 99. The relation of the blanks is again and finally changed by interchanging the blank 96 with that of the blank 98 and the blank 100 with that of 102. The operator then turns along the line 101, removing the parts 103, when the balusters are completed and will then present the appearance shown in Fig. 30 and also shown in Fig. 31 at 50. In Fig. 31 is shown in perspective a section of a balustrade with the corner-pillar 75 and the newel-post 65 united together by the top rail 110 and the bottom rail 111, and between are the various balusters 50, 60, 65, and others.

It will be observed that there will be a great saving in lumber by this art of manufacturing balusters and the like from the fact that the smaller the stick of lumber the cost is much less in proportion. Again, it will be observed that there is great economy in labor, as a number of balusters may be completed almost as quickly as one by the present process. It will also be observed that the variety of designs that may be made by this art are almost numberless and such as cannot be formed by the ordinary turning from a single piece. It will further be observed that pillars such as shown in Figs. 25 and 31 can be readily turned with unlimited designs and then united together after the turning has been accomplished.

Having now described my invention, what I claim, and desire to secure by Letters Patent, is—

1. The art of turning a number of similar forms at the same time, which consists in assembling a number of blanks, clamping the group by its periphery, then turning in a lathe the desired design, upon the outside of the group, substantially as described and shown.

2. The art of turning a number of similar forms at the same time, which consists in first grouping a number of blanks, clamping such group by its periphery, then turning in a lathe the outside of the group, then shifting the relations of the members of the group, reclamping and again turning the outside of the members of the group in their new relation, substantially as described and shown.

3. The improvement in the art of turning a number of similar forms at the same time, which consists in first grouping a number of blanks, clamping the group by its periphery, then turning in a lathe the outside of the group, then shifting the relations of the sides of each member of said group, reclamping the group, then turning the outside of the group in their new relation and repeating such shifting and turning till the desired design is turned on all the members of the group, substantially as described and shown.

In testimony whereof I affix my signature in the presence of two witnesses.

FRANK P. GRODE.

Witnesses:
M. M. CADY,
J. B. LANE.